(12) United States Patent
Labelle et al.

(10) Patent No.: US 6,173,854 B1
(45) Date of Patent: *Jan. 16, 2001

(54) POST CLOSURE FOR A TANK AND METHOD OF RETROFITTING A TANK WITH THE SAME

(76) Inventors: Robert Jacques Labelle, 243 Humberstone Road, Edmonton, Alberta (CA), T5C 4C5; Richard Donald Lyseng, 4818 - 47 Avenue, Beaumont, Alberta (CA), T4X 1G6

( * ) Notice: Under 35 U.S.C. 154(b), the term of this patent shall be extended for 0 days.

This patent is subject to a terminal disclaimer.

(21) Appl. No.: 09/361,697

(22) Filed: Jul. 27, 1999

(30) Foreign Application Priority Data

Sep. 23, 1998 (CA) .................................................. 2248054

(51) Int. Cl.[7] .................................................... B65D 43/26
(52) U.S. Cl. .................. 220/262; 220/345.2; 220/345.4; 220/345.6
(58) Field of Search ..................................... 220/260, 262, 220/345.1, 345.2, 345.3, 345.4, 345.6, 351; 105/377.08

(56) References Cited

U.S. PATENT DOCUMENTS

| | | | |
|---|---|---|---|
| 672,641 | * 4/1901 | Hirt | ................................ 220/345.6 X |
| 1,124,395 | * 1/1915 | Cottrell | ........................ 220/345.1 X |
| 2,224,094 | * 12/1940 | Small | ............................. 220/345.2 X |
| 2,842,283 | * 7/1958 | Smith | ............................... 220/349 X |
| 3,131,925 | * 5/1964 | Coats | ............................... 220/262 X |
| 3,142,410 | * 7/1964 | Arnold | ................................. 220/262 |
| 3,339,785 | * 9/1967 | Nugent | ......................... 220/345.6 X |
| 4,709,901 | 12/1987 | Pierson et al. | .......................... 251/58 |
| 5,190,182 | * 3/1993 | Copas et al. | .................. 220/345.6 X |
| 5,507,408 | * 4/1996 | Mosior et al. | .................... 220/345.2 |

* cited by examiner

Primary Examiner—Nathan J. Newhouse
(74) Attorney, Agent, or Firm—Christensen O'Connor Johnson Kindness PLLC (57) ABSTRACT

A port closure and method of installing the same. The port closure includes, in combination, a tank, a closure member and an actuator. The tank has defining walls, an exterior surface, an interior surface, an interior cavity and an access port. The closure member is disposed within the interior cavity of the tank. The closure member has an access port engaging face that is larger than a cross-sectional area of the access port. The actuator is coupled with the closure member and moves the closure member between a first position in which the access port engaging face closes the access port and a second position laterally spaced from the access port.

9 Claims, 7 Drawing Sheets

POST CLOSURE FOR A TANK AND METHOD OF RETROFITTING A TANK WITH THE SAME

FIELD OF THE INVENTION

The present invention relates to a port closure for storage and transport tanks and, in particular a port closure that can withstand a pressure differential.

BACKGROUND OF THE INVENTION

Every storage tank and transport tank has an access port. The access port may be large enough for a person to enter for the purpose of inspecting the interior of the tank or the access port may be only large enough to permit the passage of matter into the tank. With some commodities it is important that the tanks have port closures that can withstand a pressure differential between internal and external pressure. For example, in tanks used for the storage or transportation of granular or powder form dry bulk goods (such as flour, salt, cement, lime, and cereal grains) the contents are pneumatically transferred. Pneumatic transfer systems do not work properly unless the closure on the access port can maintain a pressure differential between interior pressure and exterior pressure.

The port closures in common use for such applications at the present time consist of an external lid. This external lid is held in position by a series of camlocks spaced evenly about a circumference of the access port. These closures have a number of problems. A first problem is that they are prone to leakage. A second problem is that the camlocks must be manually released. This requires a person to climb up onto the tank, and creates a potential safety hazard. The severity of the hazard depends upon the height of the tank, lighting conditions, weather conditions (wind, rain, etc), and other surrounding circumstances. A third problem is that care must be taken to ensure that the pressure within the interior of the tank is released prior to attempting to open the closure. If a pressure differential exists, the closure will open under pressure with a violent force. This violent opening force has resulted in a number of injuries and deaths as the person opening the closure has been struck by the closure and, in some cases, knocked off of the tank.

SUMMARY OF THE INVENTION

What is required is an alternative form of port closure for a tank.

According to the present invention there is provided a port closure for a tank. The port closure involves a combination which includes a tank, a closure member and an actuator. The tank has defining walls, an exterior surface, an interior surface, an interior cavity and an access port. The closure member is disposed within the interior cavity of the tank. The closure member has an access port engaging face that is larger than a cross-sectional area of the access port. The actuator is coupled with the closure member and moves the closure member between a first position in which the access port engaging face closes the access port and a second position laterally spaced from the access port.

The port closure, as described above, provides a number of advantages over an externally applied cam-lock lid. As the port closure is installed within the interior cavity of the tank, internal pressure within the tank tends to press the closure member against the access port; thereby reducing the possibility of leakage. The port closure is moved between the first position closing the access port and the second position by the actuator. There is no need for the closure member to be manually opened. This virtually eliminates the safety hazards formerly associated with opening and closing the access port.

There are various forms of actuators that can be used for the remote actuation of the closure member. The preferred form is a telescopically extendible member. For example, the telescopically extendible member can consist of a cylinder connected by fluid lines to a fluid control system that controls the supply of fluid to the cylinder to telescopically expand and contract said cylinder. This enables the closure member to be moved between the first position and the second position either hydraulically or pneumatically. With a transport tank, the hydraulic or pneumatic lines can be run off of the hydraulic or pneumatic systems of the transport vehicle.

Although beneficial results may be obtained through the use of a port closure, as described above, such a port closure can only be installed in a tank during fabrication. It is impossible to retrofit an existing tank with such a port closure installed within the interior cavity of the tank without taking the tank apart. According to another aspect of the present invention there is provided a method of retrofitting a tank with a port closure. A first step involves providing a tank having defining walls, an interior cavity and an access port through the defining walls to the interior cavity. A second step involves providing a closure member having an access port engaging face larger than a cross-sectional area of the access port. A third step involves cutting a temporary slotted opening through the defining walls of the tank large enough to accommodate the closure member. A fourth step involves passing the closure member through the slotted opening into the interior cavity. A fifth step involves coupling the closure member with an actuator positioned within the interior cavity that moves the closure member between a first position in which the access port engaging face closes the access port and a second position laterally spaced from the access port. A sixth step involves closing the temporary slotted opening.

Although beneficial results may be obtained through the use of a port closure, as described above, there are measures that can be taken to improve the sealing engagement between the closure plate and the access port. Even more beneficial results may, therefore, be obtained when a seal is mounted to either the defining walls on the interior surface of the tank circumjacent the access port or the access port engaging face of the closure member.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, a port closure for a tank generally identified by reference numeral 10, will now be described with reference to FIGS. 1 through 7.

Figure 1:
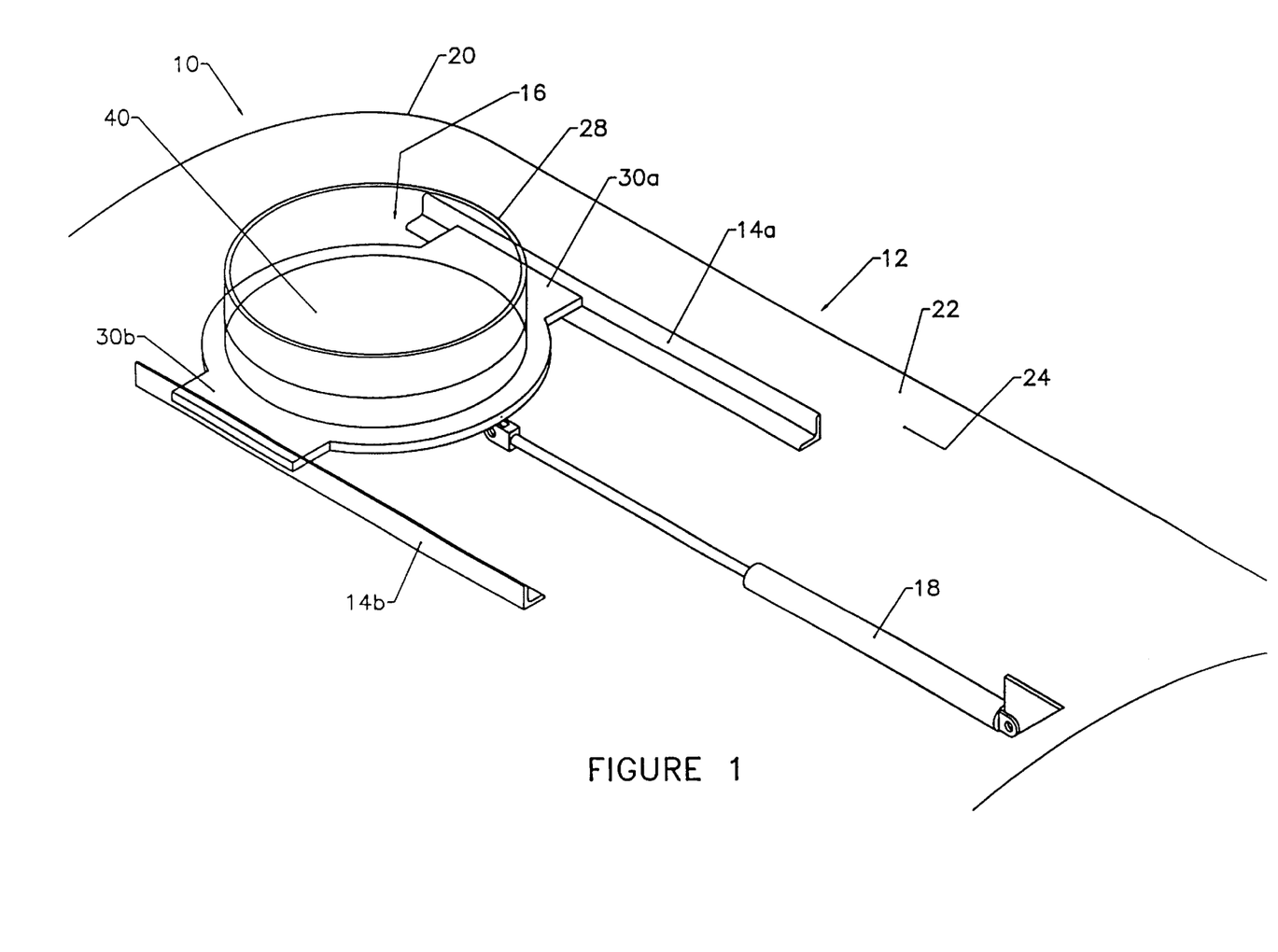
FIG. 1 is a cutaway perspective view of a port closure for a tank constructed in accordance with the teachings of the present invention with the closure member in a first position closing an access port.
Figure 4:
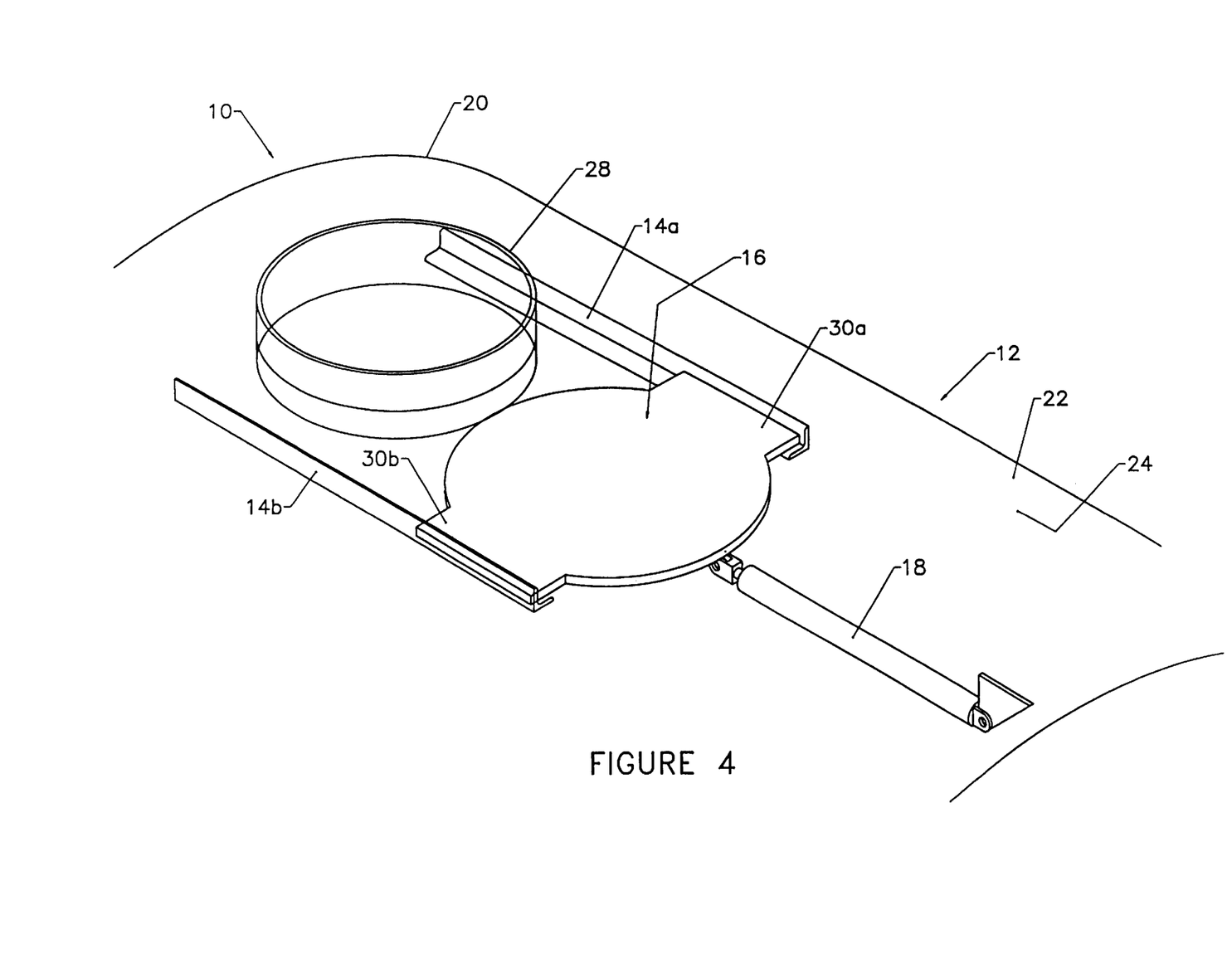
FIG. 4 is a cutaway perspective view of a port closure for a tank constructed in accordance with the teachings of the present invention with the closure member in a second position laterally spaced from an access port.

Referring to FIGS. 1 and 4, port closure 10 includes a combination of a tank 12, a pair of guide tracks 14a and 14b, a closure member in the form of a closure plate 16 and a remotely controlled actuator preferably in the form of a telescopically extendible cylinder 18. Tank 12 has defining walls 20, an exterior surface 22, an interior surface 24, an interior cavity 26 and an access port 28. One of the pair of guide tracks 14a and 14b is mounted to the defining walls 20 on the interior surface 24 of the tank 12 on each of two opposed sides of the access port 28.

Closure plate 16 has a pair of opposed track engaging edges 30a and 30b. The track engaging edges 30a and 30b are engaged with the pair of guide tracks 14a and 14b. Closure plate 16 is movable along the guide tracks 14a and 14b between a first position closing the access port 28, illustrated in FIGS. 1 through 3, and a second position laterally spaced from the access port 28, illustrated in FIGS. 4 through 6.

Figure 3:
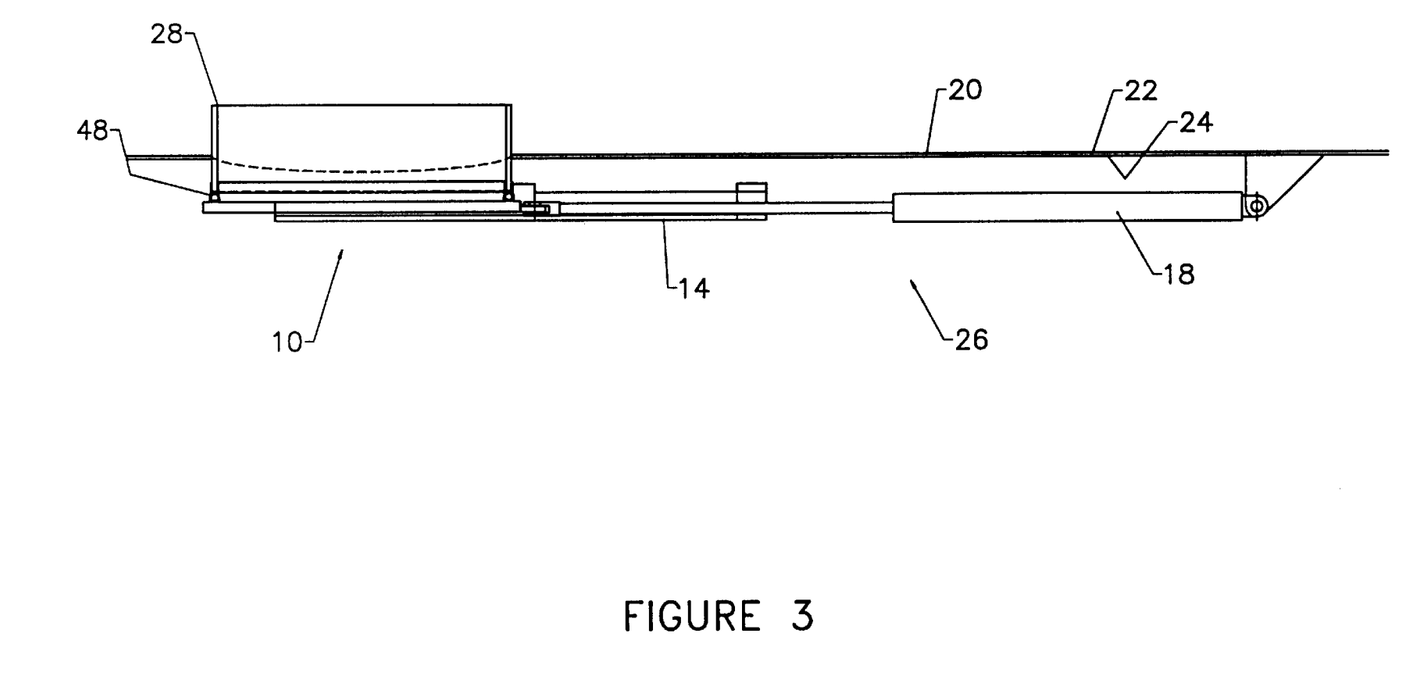
FIG. 3 is side elevation view, in section of the port closure for a tank illustrated in FIG. 1.
Figure 6:
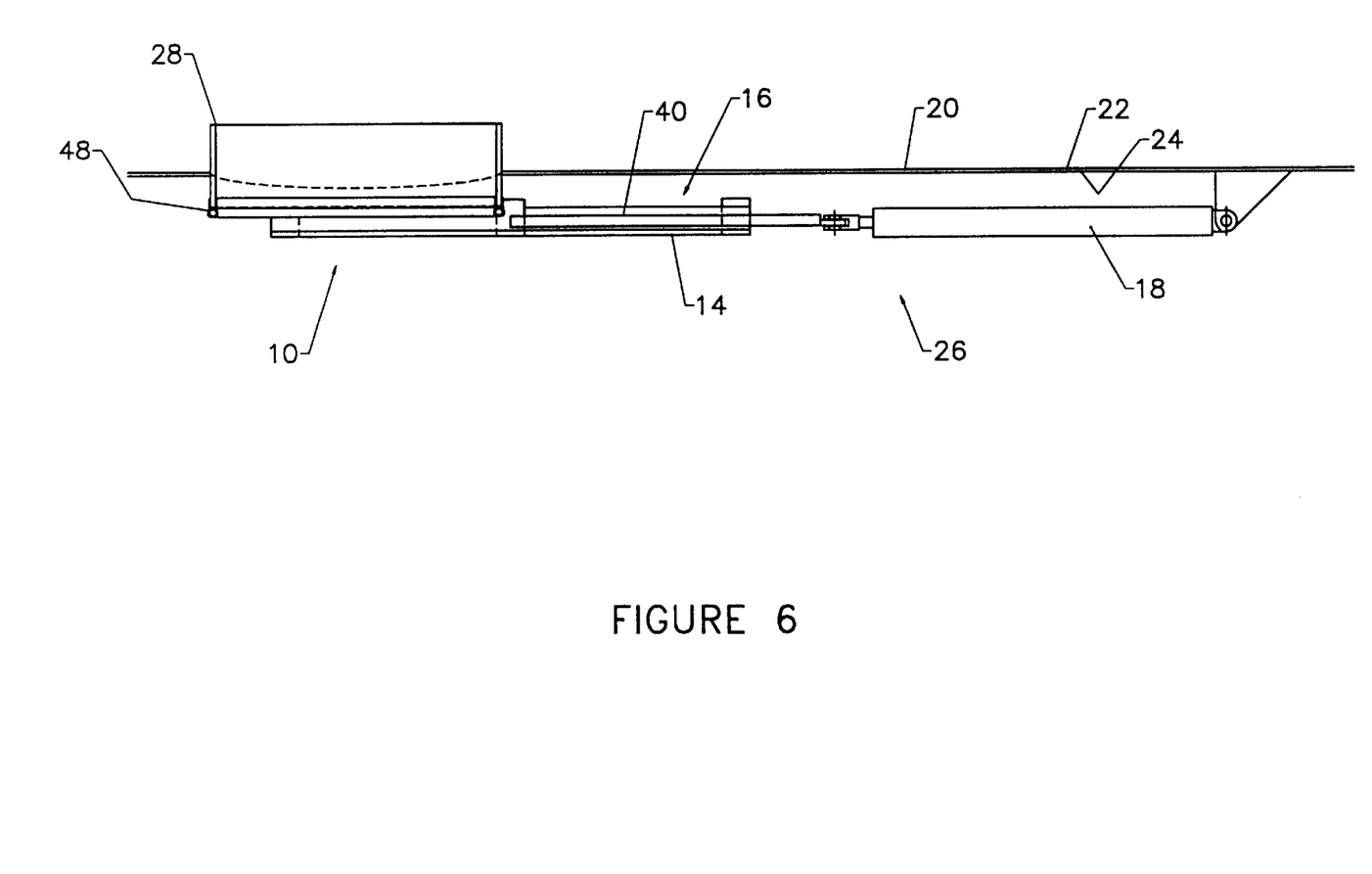
FIG. 6 is side elevation view, in section of the port closure for a tank illustrated in FIG. 4.

Referring to FIGS. 3 and 6, a seal ring 48 is mounted to the defining walls 20 on the interior surface 24 of tank 12 circumjacent the access port 28. Seal ring 48 sealingly engages the access port engaging face 40 of closure plate 16 when closure plate 16 is in the first position closing the access port 28 as illustrated in FIG. 3.

Referring to FIGS. 1 through 6, a remotely controlled actuator means such as telescopically extendible actuator cylinder 18 is coupled with closure plate 16 to allow remotely controlled movement of closure plate 16. Cylinder 18 is connected by fluid lines to a remotely located fluid control system (not shown) that controls the supply of fluid to cylinder 18 to telescopically expand and contract cylinder 18, thereby moving closure 16 between the first position illustrated in FIGS. 1 through 3 and the second position illustrated in FIGS. 4 through 6.

When a closure plate 16 is to be fitted into a new tank 12 closure plate 16 can be constructed from a single planar sheet of material. When it is necessary to retrofit an existing tank 12 without opening up said tank 12, closure plate 16 is inserted inside tank 12 in accordance with the teachings of the preferred method that will hereinafter be further described.

Figure 2:
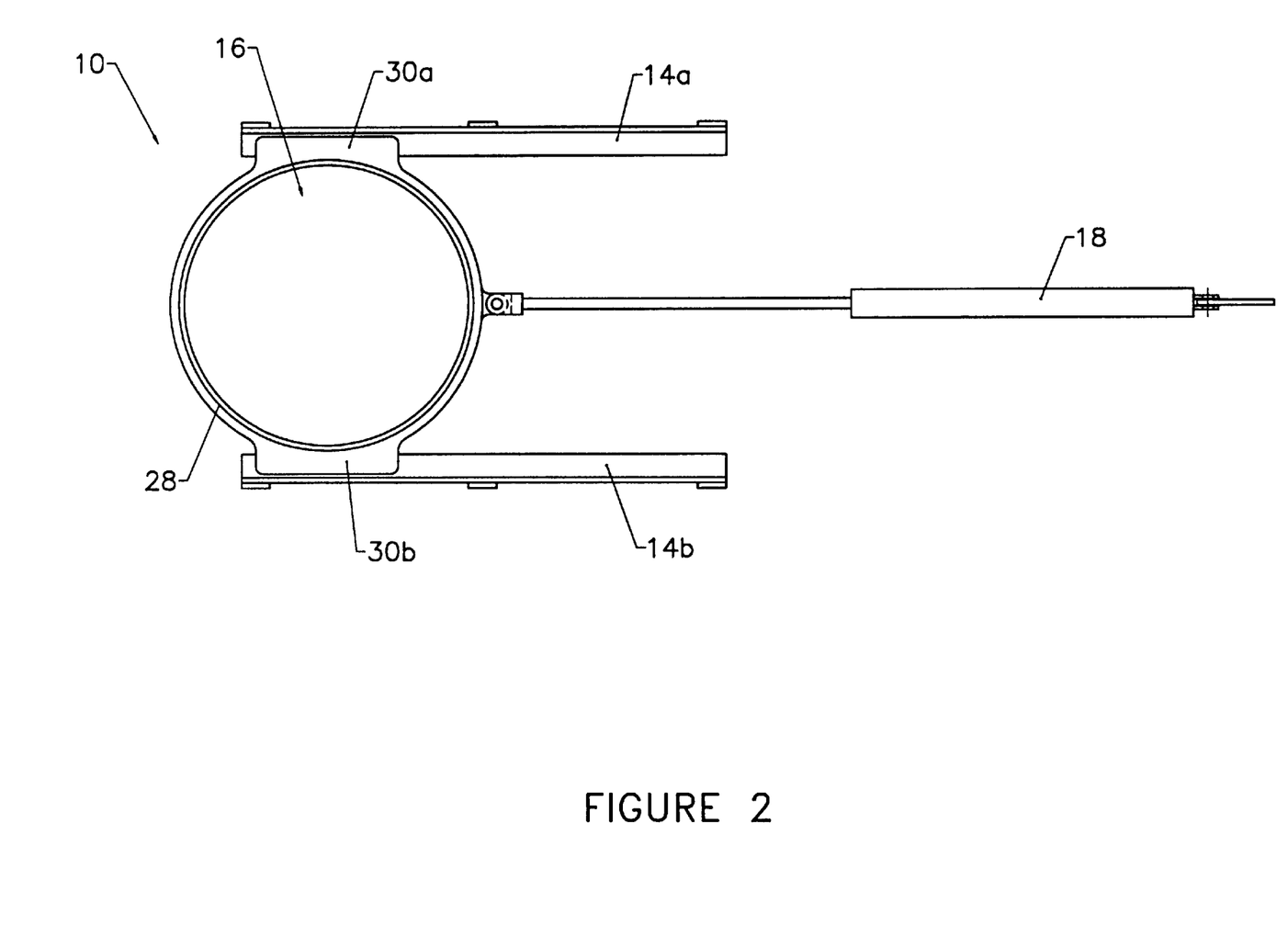
FIG. 2 is a top plan view of the port closure for a tank illustrated in FIG. 1.
Figure 5:
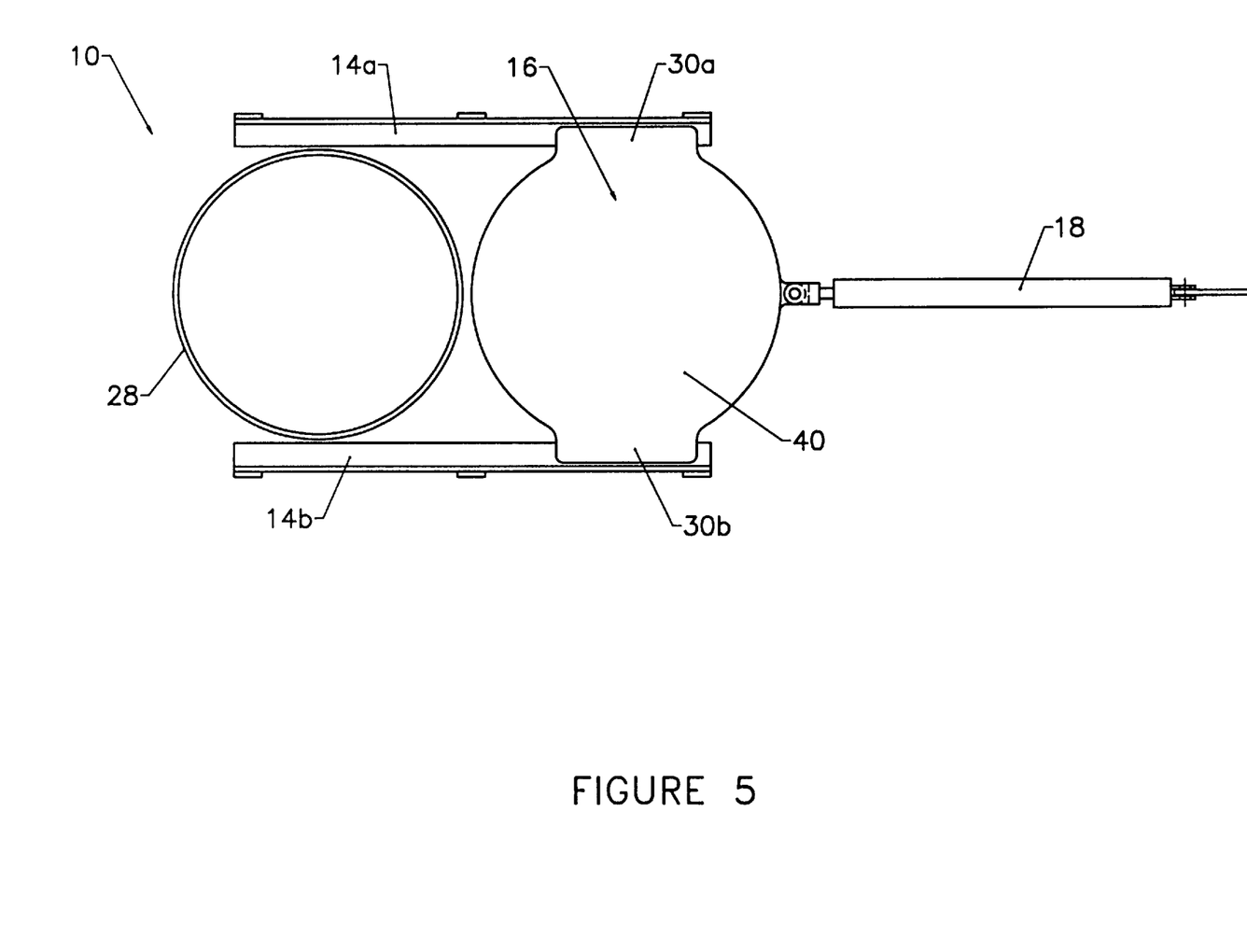
FIG. 5 is a top plan view of the port closure for a tank illustrated in FIG. 4.
Figure 7:
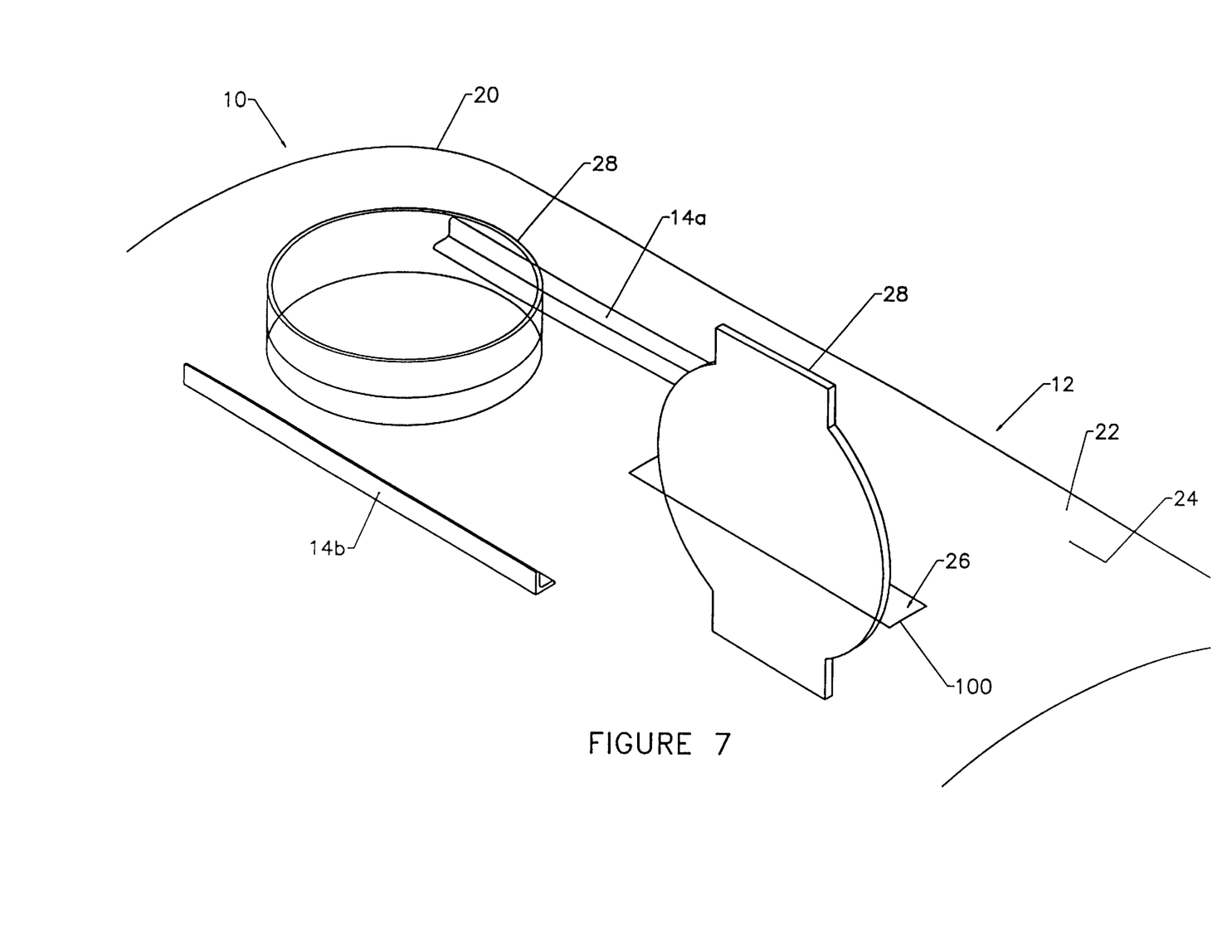
FIG. 7 is a perspective view of a closure member of the port closure for a tank illustrated in FIGS. 1 and 4, being installed in accordance with the teachings of the preferred method.

The use and operation of port closure 10 will now be described with reference to FIGS. 1 through 7. Referring to FIG. 7, in order to retrofit an existing tank 12 with closure plate 16, a temporary slotted opening 100 is cut through defining walls 20 of tank 12. Temporary slotted opening 100 is just large enough to accommodate closure plate 16. Closure plate 16 is then passed through slotted opening 100 into interior cavity 26 of tank 12. Once positioned within interior cavity 26, closure plate 16 is coupled with actuator cylinder 18 that serves to move closure plate 16 member between a first position in which the access port engaging face closes the access port and a second position laterally spaced from the access port. Temporary slotted opening 100 has then served its intended purpose and can be closed in a permanent fashion by welding or fitted with a closure (not shown) that will permit slotted opening 100 to be reopened for repairs at a later date. Closure plate 16 is movable along guide tracks 14a and 14b between the first position closing access port 28, as illustrated in FIGS. 1 through 3, and the second position laterally spaced from access port 28, as illustrated in FIGS. 4 through 6. Cylinder 18 telescopically expands or contracts to move closure plate 16 from the first position closing access port 28 to the second position laterally spaced from access port 28. The movement of cylinder 18 is hydraulically or pneumatically controlled from a remotely located location, such as a cab of a transport vehicle or a control room of a storage facility. Should pressure increase within tank 12, the pressure will force access port engaging face 40 of closure plate 16 into increased sealing engagement with seal ring 48.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A port closure for a tank, comprising in combination:
   a tank having defining walls, an exterior surface, an interior surface, an interior cavity and an access port;
   a closure member disposed within the interior cavity of the tank, the closure member having an access port engaging face larger than a cross-sectional area of the access port; and
   an actuator positioned within the interior cavity of the tank and coupled with the closure member, the actuator moving the closure member between a first position in which the access port engaging face of the closure member closes the access port and a second position in which the closure member is laterally spaced from the access port while remaining fully within the interior cavity of the tank.

2. The port closure for a tank as defined in claim 1, wherein a guide is provided to guide movement of the closure member between the first position and the second position.

3. The port closure for a tank as defined in claim 2, wherein a pair of guide tracks are mounted to the defining walls on the interior surface of the tank, one of the pair of guide tracks being mounted on each of two opposed sides of the access port; and
   the closure member has a pair of opposed track engaging edges, the track engaging edges engaging the pair of guide tracks.

4. The port closure for a tank as defined in claim 1, wherein the actuator is a telescopically extendible member.

5. The port closure for a tank as defined in claim 4, wherein the telescopically extendible member is a fluid cylinder connected by fluid lines to a remotely located fluid control system that controls the supply of fluid to the cylinder to telescopically expand and contract said cylinder.

6. The port closure for a tank as defined in claim 5, wherein the fluid cylinder is pneumatically operated.

7. The port closure for a tank as defined in claim 5, wherein the fluid cylinder is hydraulically operated.

8. The port closure for a tank as defined in claim 1, wherein a seal is mounted to one of the defining walls on the interior surface of the tank circumjacent the access port and the access port engaging face of the closure member.

9. A method of retrofitting a tank with a port closure, comprising the steps of:

providing a tank having defining walls, an interior cavity and an access port through the defining walls to the interior cavity;

providing a closure member having an access port engaging face larger than a cross-sectional area of the access port;

cutting a temporary slotted opening through the defining walls of the tank large enough to accommodate the closure member;

passing the closure member through the slotted opening into the interior cavity;

coupling the closure member with an actuator positioned within the interior cavity that moves the closure member between a first position in which the access port engaging face closes the access port and a second position laterally spaced from the access port; and closing the temporary slotted opening.

* * * * *